W. BEEHLER.
BORING MACHINE.
APPLICATION FILED MAY 19, 1910.
984,792.
Patented Feb. 21, 1911.
2 SHEETS—SHEET 1.
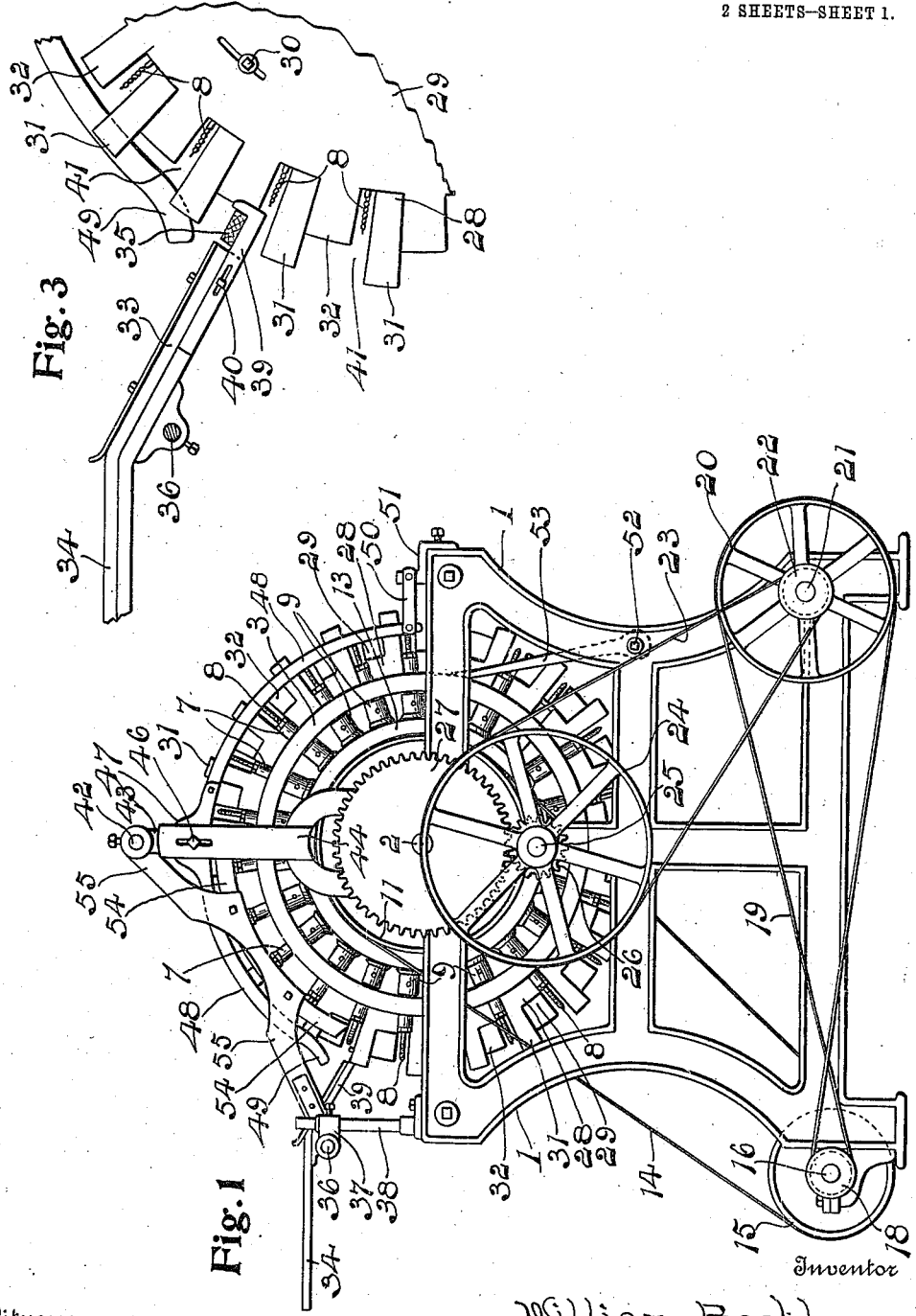
Witnesses
G. M. Shannon
K. E. McGrann
Inventor
William Beehler
By Lewis E. Flanders
Attorney

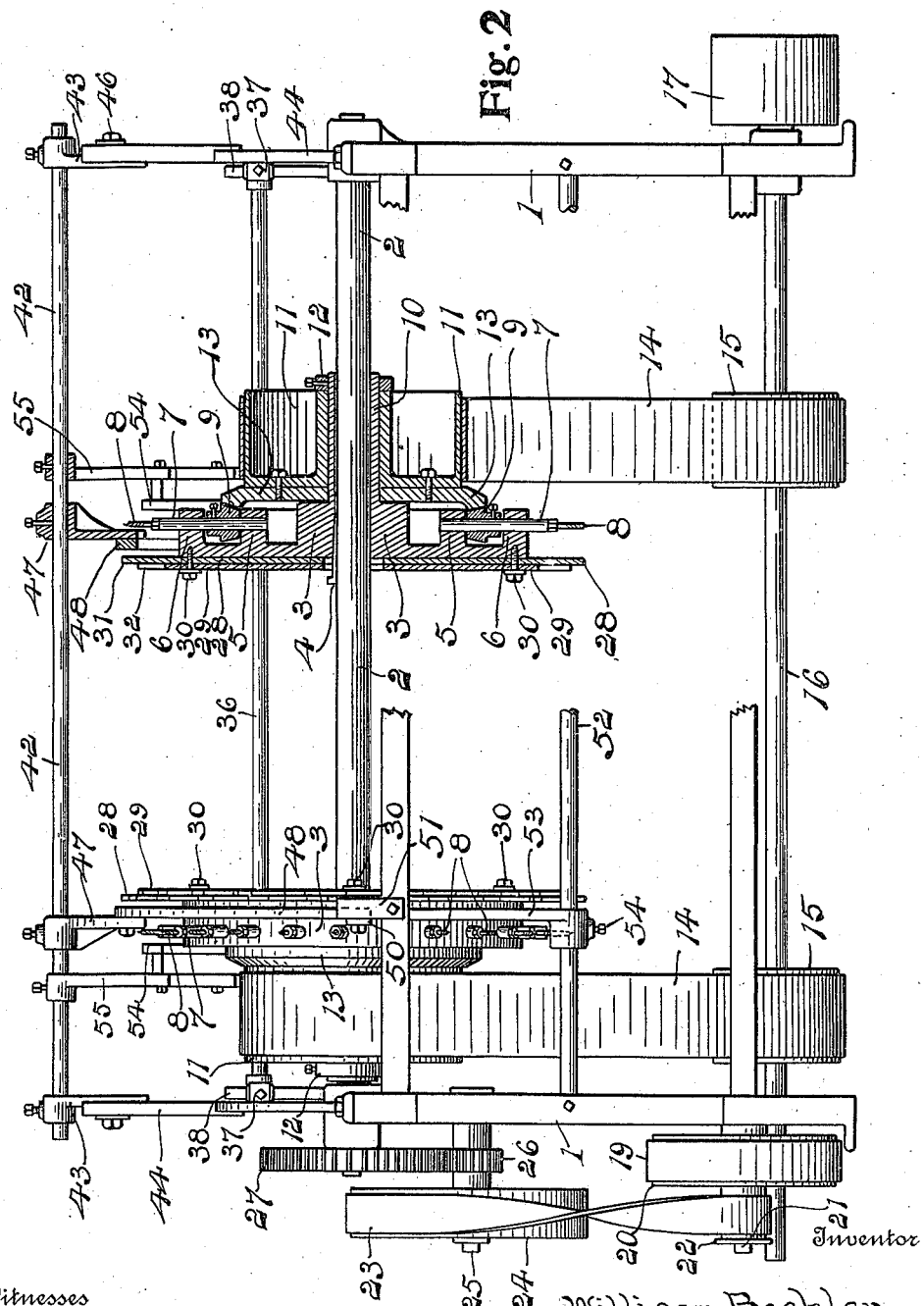

UNITED STATES PATENT OFFICE.

WILLIAM BEEHLER, OF OWOSSO, MICHIGAN, ASSIGNOR OF ONE-HALF TO BERTRON K. BOYD, OF OWOSSO, MICHIGAN.

BORING-MACHINE.

984,792.  Specification of Letters Patent.  Patented Feb. 21, 1911.

Application filed May 19, 1910. Serial No. 562,218.

*To all whom it may concern:*

Be it known that I, WILLIAM BEEHLER, a citizen of the United States, residing at Owosso, in the county of Shiawassee and State of Michigan, have invented certain new and useful Improvements in Boring-Machines, of which the following is a specification.

This invention relates to a boring machine and more particularly to a machine which is especially adapted for boring holes in wooden strips or slats such as are used in the construction of crates and similar articles.

The object of the invention is to provide a machine which will have a very large capacity and in which each boring tool will have ample time to do its work without crowding and consequent injury from over heating.

To this end the invention consists in providing one or more rotatable tool carrying heads having radial boring tools and a holder rotatable with said head or heads to receive and hold the work in alinement with the several tools as said heads are rotated.

The invention further consists in providing means for feeding the work to the tools and automatically discharging the same, and in providing certain other new and useful features in the construction and arrangement of parts, all as hereinafter more fully described reference being had to the accompanying drawings in which, Figure 1 is an end elevation of a machine embodying the invention; Fig. 2 is a front elevation of the same with parts in section to show the construction; and Fig. 3 is an enlarged detail of the carrier disks and means for feeding slats thereto.

In the drawings 1 represents a suitable supporting frame provided with bearings for a shaft 2 extending horizontally across the same and upon which shaft are mounted two circular heads 3 adjustably secured to the shaft by means of keys 4 to turn therewith. These heads are each provided with bearings 5 and 6 for a series of radially extending spindles 7 to the outer end of each of which spindles is secured a boring tool 8 and upon each spindle between said bearings is secured a beveled pinion 9 by means of which said spindles are rotated in their bearings and held against longitudinal movement therein. Each head is also provided with a laterally extending sleeve portion 10 upon the shaft 2 and mounted to turn freely upon this sleeve is a large pulley 11 held against longitudinal movement upon the sleeve by means of a collar 12 secured to the outer end of the sleeve. Bolted to the end of the pulley adjacent to the head is a large beveled gear 13 with its teeth in mesh with the beveled pinion 9 secured upon the several spindles to simultaneously turn said spindles.

The pulley 11 of each head with its gear 13 is driven by means of a belt 14 engaging the pulley and also a pulley 15 on a driving shaft 16 mounted in bearings on the machine frame and extending horizontally across the same near the bottom thereof. The shaft 16 is driven in any suitable manner, as by power applied to a driving pulley 17 secured upon one end thereof. Secured to the opposite end of said shaft is a pulley 18 from which motion is transmitted by a belt 19 to a pulley 20 upon a short shaft 21 mounted in bearings on the machine frame. From a small pulley 22 on the shaft 21 slow motion is transmitted by a belt 23 to a large pulley 24 mounted upon a short shaft 25 adjacent to one end of the main shaft 2. This shaft 25 is provided with a pinion 26 in mesh with a large gear 27 secured to the end of said shaft 2 and thus said shaft upon which the heads 3 are mounted is turned with a slow motion.

Secured to the adjacent faces of each of the two heads 3 are two disks 28 and 29 by bolts 30 extending through slots in said disks. Each disk is provided with a series of notches in its periphery forming radially extending fingers 31 on the disk 28 and similar fingers 32 of lesser length on the disk 29. Guide ways 33 leading from a table or similar support 34 for a supply of slats 35 to be bored, are adjustably secured to a rod 36 which in turn is adjustably carried by brackets 37 adjustable vertically upon posts 38 bolted to the machine frame at one side of the heads 3. The slats are caught as they pass out of the lower end of the guides 33, one at a time, by bars 39 having hooked lower ends to hold the slat in position to be engaged by the fingers 31 as the heads are turned and lift the slat off from the bars. These bars 39 are adjustably secured to the guides 33 by bolts 40 extending through longitudinal slots in the bars so that said bars may be adjusted longitudinally according to the width of the slats 35. The disks 28 and 29 are adjusted relative to each other so that there will be spaces 41 between the fingers 31 and 32 just wide enough to receive one of the slats 35 edgewise and the disks are adjusted so that these slots will come opposite the boring tools 8 and thus when the slats 35 are lifted from the hooks 39 and slide edgewise inward upon the edges of the fingers 31, they will engage the ends of the tools in proper position to be bored by said tools.

Extending horizontally across the frame vertically above the shaft 2 and the heads 3 thereon, is a supporting rod 42 mounted at its ends in bearing members 43 which are adjustably supported by brackets 44 mounted upon the ends of the machine frame. This rod may be raised or lowered by adjusting the bearing members 43 upon the brackets 44, said brackets being provided with slots to receive bolts 46 for securing the bearing members thereto. Supported by suitable hangers 47 to the lower ends of which they are bolted, are semi-circular guide bars 48 and these guide bars are suspended by the hangers 47 adjacent to one side of the fingers 31. Each guide bar is also so supported that its inner edge will be eccentric to the head and is so held that as the slats are carried upward from the supporting hooks 39 by the fingers 31, they will engage the inner edge of each guide bar 48 and by reason of the eccentric position of said guide bar will be forced radially inward in the slots 41 by said bars, forcing the slats inward upon the boring tools which are thus caused to bore the desired holes therethrough. The bars 48 are curved at one end as at 49 so that the slats will readily pass under the bar and at their opposite ends said bars are each held by a link 50 pivotally attached thereto and to a lug on a clip 51 adjustably secured to a bar extending across the frame. Extending across the machine frame at the opposite side of the heads 3 is a rod 52 upon which is mounted arms 53 adapted to be slid longitudinally of the rod and secured in their adjusted position by set screws 54 with their upper ends adjacent to the outer periphery of the heads 3 and in line with the guide bars 48 so that when the slats have been carried over to the rear or discharge side of the machine by the turning of the heads and have been forced inward upon the tools by the guide bars 48 and bored, they will come in contact with the arms 53 which will engage their inner edges and by reason of the inclination of said arms will be lifted from the tools and fall from the slots 41 between the fingers of the disks. To engage each end of each slat as it is carried upward from the end of the feed guides 33 and center said slat endwise relative to said heads, semi-circular plates 54 are held in proper position relative to the heads by bars 55 to which they are bolted, said bars 55 being adjustably supported at their upper ends upon the rod 42 and at their lower ends upon the rod 36.

The boring tools are driven at a high rate of speed by means of the gears 13 driven by the pulleys 11 and the heads are turned at the same time with comparatively slow speed by power applied to the gears 27. The slats are thus bored while they are being carried from one side to the other of the heads, said slats being gradually forced inward upon the boring tools by the guide bars 48 and thus each tool is given ample time to do its work without forcing the work too rapidly into engagement therewith and overheating the tool. The arrangement of a rotatable head provided with radial tools and also with means for carrying the work, permits of the boring of a large number of slats at one time, thus giving to the machine a great capacity and providing a very simple and compact arrangement.

The heads 3 may be adjusted upon their shaft 2 for different lengths of slats and also to bore the holes at any desired distance from the ends of the slats or any desired distance apart. If it is desired to bore more than two holes in each slat other heads similarly provided with boring tools may be placed upon the shaft and if it is desired to bore but one hole in each slat, one of the heads may be dispensed with, the disks being otherwise supported upon the shaft, or other suitable means may be provided for holding one end of the slats.

Having thus fully described my invention what I claim is:

1. A machine of the character described comprising a rotary tool carrying member having a series of tools, and means rotatable with said member for holding work in alinement with the several tools as said member is rotated.

2. A machine of the character described comprising a rotary head, a series of radially extending boring tools carried by said head, and means adjacent to the periphery of said head and movable therewith for holding work while the head is turned.

3. A machine of the character described comprising a rotatable head, a series of boring tools carried by said head, and means for holding pieces of work in position to be simultaneously bored by a plurality of said tools while the head is turned.

4. A machine of the character described comprising a rotatable head, radially extending tools carried by said head and arranged in a vertical plane, and means movable with said head for holding work in position to be bored by a plurality of the tools during the travel of said tools around the upper side of the head.

5. A machine of the character described comprising a rotatable head, a series of radially extending boring tools carried by the head, and a rotatable member formed at its periphery to receive and hold in alinement with said tools a series of pieces to be bored.

6. A machine of the character described comprising a rotary head, a series of radially extending boring tools carried by said head, means for simultaneously rotating all of the tools, separate means for rotating the head, and means for holding work in alinement with the tools rotatable with the head.

7. A machine of the character described comprising a rotatable head, a series of radially extending boring tools carried by said head, means rotatable with the head for holding work, and means adjacent to the outer ends of the tools adapted to engage the work and force the same inward upon the tools as the head is turned.

8. A machine of the character described comprising a rotary head, a series of radially extending boring tools carried by said head, means movable with the head for guiding work radially of the head into engagement with the tools, and fixed means to engage the work and move the same radially toward the head as the head is turned.

9. A machine of the character described comprising a rotary head, a series of radially extending boring tools carried by said head, means movable with the head for guiding work radially toward the tools, and a curved member adjustably supported eccentrically to the head to engage the work and force the same radially toward the head.

10. A machine of the character described comprising a rotary head, a series of boring tools carried by said head, and a rotatable member adjacent to the head provided with peripheral slots opposite said tools to receive and hold work.

11. A machine of the character described comprising a plurality of rotatable heads mounted upon a horizontally extending shaft, a plurality of radially extending boring tools carried by each of said heads, members adjacent to and rotatable with the heads and formed with radial slots in their peripheries, means for feeding work into said slots at one side of said heads, and means for removing the work therefrom at the opposite side of said heads.

12. A machine of the character described comprising a horizontally extending rotatable shaft, a plurality of members upon said shaft adapted to receive work at their peripheries to hold the same, a rotatable head on the shaft, a series of radially extending boring tools carried by the head to engage the work during the turning of the head, means for feeding work to the work carrying members at one side thereof, and means at the opposite side of said members for removing the work therefrom.

13. A machine of the character described comprising a rotatable head, a series of radially extending boring tools carried by said head, and a member carried by the head and formed at its periphery with radially extending fingers forming slots between to receive and hold the work in position to be engaged by said tools.

14. A machine of the character described comprising a rotatable head, a series of radially extending boring tools carried by said head, a pair of plates carried by the head, and each formed with radially extending fingers forming slots between, and means for adjustably securing the plates together and to the head.

15. A machine of the character described comprising a rotatable head, a series of radially extending boring tools carried by the head, a pair of plates carried by the head and adjustably secured thereto, and each formed with radially extending fingers forming work receiving slots between, the fingers on one plate being of greater length than those on the other plate, and means for feeding slats, one at a time, and holding the slat in position to be engaged and removed by the longer of the fingers on said plates.

16. A machine of the character described comprising a shaft, a rotatable head on said shaft, a series of radially extending tool carrying spindles mounted in bearings on said head, pinions on said spindles, a gear in engagement with said pinions, means for turning the gear to actuate the spindles, separate means for rotating the head, and a member rotatable with the head and adapted to hold work at its periphery in alinement with the spindles.

In testimony whereof I have affixed my signature in presence of two witnesses.

WILLIAM BEEHLER.

Witnesses:
O. L. DAVIS,
FRED D. JOHNSON.